Patented Apr. 11, 1950

2,503,913

UNITED STATES PATENT OFFICE 2,503,913

PROCESS OF DRYING INORGANIC
HYDROGEL PARTICLES

Charles N. Kimberlin, Jr., and Jerry A. Pierce, Baton Rouge, La., assignors to Standard Oil Development Company, a corporation of Delaware No Drawing. Application June 21, 1944,
Serial No. 541,454

1 Claim. (Cl. 34—9)

This invention relates to a process for the drying of hydrous oxides and more particularly relates to the manufacture of an improved gel in spherical form having a low apparent density.

Inorganic gels are well-known and have long been used for various purposes, for example, for the adsorption of condensible vapors from gaseous carriers and for catalytic purposes either as the catalyst itself or as a component thereof or as a carrier. The most widely used of these inorganic gels in the dried condition is that of silica with or without the addition of other gelatinous materials such as alumina.

Such gels have been found to be particularly useful as catalysts for carrying out reactions involving hydrocarbons and particularly in the so-called fluid catalyst process in which the catalyst is in a finely powdered form and is aerated or fluidized by means of a gas so that it behaves similar to a liquid, exhibiting properties such as fluid flow, hydrostatic pressure, and the like. The hydrostatic property of these powdered catalysts is particularly useful in circulating the catalyst through the system. These powdered catalysts are generally prepared by grinding silica gel or other types of gels to the desired size. It has recently been found that catalysts having a particle size within the desired range for the fluid catalyst process, that is between 20 and 200 microns, can be prepared by causing a sol of the desired gel-forming substance to set while dispersed in a water-immiscible liquid, such as oil, whereby small spherical particles having diameters less than one millimeter are obtained. The microspheres thus obtained are washed and dried, usually in air, and then heated to a temperature between 850 and 1200° F. for purposes of activation. However, during the drying step, it has been observed that these small spheres tend to agglomerate to such an extent that the advantage of the spherical form is lost. Furthermore, it is found that the activity of the spheres thus dried is rather low. This is indicated by the relatively high apparent density and correspondingly low average pore size.

It is, therefore, one object of this invention to prepare a catalyst having a low apparent density suitable for use in the powdered catalyst process.

It is another object of this invention to produce catalysts having increased activity and increased heat and steam stability.

A further object of this invention is to dry hydrogel spheres under such conditions that they do not agglomerate to form larger particles.

These and other objects of this invention are attained by first forming the hydrogel of the desired gel-forming substance and then drying the hydrogel in the presence of a surface-active agent which may display emulsifying or wetting properties. The term "surface-active agent" is used herein to designate a substance which alters the energy relationship at interfaces or, in other words, modifies the surface tension of the material to which it is added.

The drying of the spherical hydrogels in the presence of the surface-active agent may be carried out in any desired manner. For example, the hydrogel may be covered with a water-immiscible liquid to which the surface-active agent has been added, or the water in the hydrogel may be displaced by a partially water-miscible liquid containing a small amount of the surface-active agent, or the surface-active agent may be applied directly to the hydrogel and the gel dried in the usual manner in the presence of the surface-active agent alone.

When drying the hydrogels in the presence of a water-immiscible liquid containing a small amount of the surface-active agent, the hydrogel may be covered with the liquid and then heated in a steam oven until the water is driven off, after which the excess liquid is poured off and the hydrogel is heated to a temperature between 850 and 1200° F. to burn off residual liquid. Excellent results may also be obtained by refluxing the hydrogel in the presence of the water-immiscible liquid, condensing the vapor in a water separator and recycling the water-immiscible liquid.

When displacing the water from the hydrogel by means of a partially water-miscible liquid having a low surface tension and containing a small amount of a surface-active agent, the hydrogel may be washed with the partially water-miscible liquid, the excess liquid decanted off and the gel dried. Alternatively, the hydrogel may be refluxed with the partially water-miscible liquid so as to remove the water as an azeotrope with the partially water-miscible liquid, then allowing the distillate to stratify to form a layer of water and a layer of the partially water-miscible liquid. The water is removed and the partially water-miscible liquid is recycled to the distillation step. This process is continued until all the water is removed from the hydrogel, after which the excess of partially water-miscible liquid is removed from the gel and the gel dried. Excellent results may also be obtained by treating the hydrogel with the partially water-miscible liquid containing a small amount of a surface-active agent at a temperature at which the miscibility of the liquid with water is substantially increased, then removing the aqueous solution thus formed and adjusting the temperature to a point at which the greater portion of the water separates, and recycling.

Although this invention is not to be limited to any theory of what occurs during the drying, it is believed that the cause of the small pore size in the gel dried in air and then heated to a high temperature is the fact that the walls of the pores in the hydrogel are in a plastic condition during drying and that as a result of the high surface tension of the water the capillary pores are pulled together as the water is evaporated. On the other hand, the displacement of the water by a partially water-miscible liquid results in less shrinkage of the pores during drying, due to the fact that the surface tension of the liquid filling the pores is less than that of water. Similarly, when the hydrogel is dried in the presence of a water-immiscible liquid, the liquid-water interfacial tension is much lower than the surface tension of water and the resulting tendency of the pores to collapse as the water is removed is materially less. Now, when a surface-active agent is added to either the partially water-miscible liquid or to the completely water-immiscible liquid, the surface tension and interfacial tension, respectively, are further lowered, with the result that shrinkage is less and the pores are larger, resulting in a lower apparent density of the final gel. Similar results are obtained when the hydrogel is dried merely in the presence of a small amount of an added surface-active agent. This material acts to lower the surface tension of the water and thereby decrease the tendency of the pores to collapse.

Suitable surface-active agents for use according to this invention are lecithin, organic sulfates and sulfonates, partial esters of poly-hydroxy alcohols, commercial wetting agents such as Span "80" (an oil-soluble sorbitan mono-oleate supplied by Atlas Powder Company), and Tween "80" (a water-soluble sorbitan mono-oleate polyoxyalkylene derivative supplied by Atlas Powder Company), etc.

Suitable water-immiscible liquids which may be used in conjunction with the surface-active agent in accordance with this invention are kerosene, heavy naphtha, lubricating oil, benzene, and the like; other organic liquids may also be used which are immiscible with water and do not have any injurious effect on the gel.

Suitable partially water-miscible liquids which may be used in conjunction with the surface-active agent in accordance with this invention are: n-butyl alcohol, sec.-butyl alcohol, methyl ethylketone, diethylketone, mesityloxide, butyl aldehyde, propionitrile, acrylonitrile, valeric acid, nitromethane, etc. The term "partially water-miscible liquid" used herein is intended to cover those liquids which are not soluble in or miscible with water in all proportions, i. e., those materials which have a relatively low solubility in water and which form a separate layer in contact with water.

The following examples illustrate the advantages which may be obtained by drying hydrogels in the above-described manner in the presence of surface-active agents.

Example 1

Silica hydrogel microspheres were covered with a light lubricating oil and the mixture heated with slow stirring until the water was removed. The excess oil was filtered off and the product gradually heated to 1000° F. The silica gel microspheres thus obtained had an apparent density of 0.72.

Example 2

Another portion of silica hydrogel microspheres was dried in exactly the same manner as in Example 1 except that to the oil used was added 0.2% of lecithin obtained from soya beans. The lecithin made it much easier to keep the microspheres dispersed in the oil. The silica gel microspheres obtained had an apparent density of 0.46.

Example 3

A portion of silica hydrogel microspheres was covered with butanol and the mixture distilled with slow stirring until the water was removed. The excess butanol was removed by filtration and the product gradually heated to 1000° F. The apparent density of the silica gel microspheres obtained was 0.33.

Example 4

A portion of silica hydrogel microspheres was dried in the same manner as in Example 3 except that the butanol contained 0.5% Span "80." Span "80" is an oil-soluble surface-active agent consisting of sorbitan mono-oleate supplied by the Atlas Powder Company. The silica gel microspheres obtained had an apparent density of 0.27.

Example 5

A portion of silica hydrogel microspheres was impregnated with aluminum sulfate solution to give a product containing 12½% (on the dry basis) of alumina. The alumina was fixed by a treatment with slightly less than the theoretically required amount of 3% ammonium hydroxide. The product was washed free of sulfate ions and divided into two portions, A and B. Catalyst A was dried in a steam oven. The dried microspheres thus obtained stuck together so badly that the effect of the spherical shape was lost. Catalyst B was impregnated with 0.2% Tween "80" and dried in a steam oven and then heated to 850° F. There was no tendency for the microspheres thus produced to stick together.

The properties of the catalysts produced by each of the above methods are shown in the following table:

| Catalyst | Apparent Density, g./cc. | Specific Surface, m.²/g. | Cracking Tests % D+L [1] | | |
|---|---|---|---|---|---|
| | | | Heated 3 Hrs. at 850° F. | Heated 3 Hrs. at 1600° F. | Steamed 24 Hrs. at 1050° F. and 60 lbs./sq. in. |
| A | 0.92 | 360 | 57 | 30 | 27 |
| B | 0.77 | 528 | 59 | 44 | 28 |

[1] Distillate plus loss from Engler distillation at 400° F. of the product obtained by cracking light East Texas gas oil with a catalyst under standardized conditions.

From the above examples it is clear that spheres of gel catalysts which can be used in the fluid catalyst process without further grinding can be prepared since the method described of drying hydrogel spheres in the presence of a surface-active agent results in the formation of particles which retain the original discrete form and do not tend to form larger aggregates. Furthermore, the apparent density of the particles is lowered and the catalytic activity and stability to steam and heat are increased by the use of the surface-active agent. The spherical gels prepared according to this invention are particularly suitable as catalysts in the fluid catalyst process for hydrogenating, dehydrogenating, alkylating and cracking hydrocarbons, reforming and desulfurizing naphtha, and for hydrogenating oxides of carbon.

Although the invention has been described in connection with the drying of hydrogel spheres, it is understood that the process of this invention in its broadest concept is adapted to the drying of any type of hydrogel in any shape that it may be found. Furthermore, the precise details enumerated in the above examples, obviously, are not fixed and numerous modifications of the procedures of these examples may be made by those skilled in the art without departing from the spirit and scope of this invention.

The nature and object of the present invention having thus been set forth and specific examples of the same given what is new and useful and desired to be secured by Letters Patent is:

A process for drying inorganic hydrogel particles comprising mixing said hydrogel particles with normal butanol containing 0.5% of sorbitan mono-oleate, distilling the water from said hydrogel particles as an azeotrope with said butanol until the water is removed from the hydrogel and then removing the butanol from the dehydrated hydrogel.

CHARLES N. KIMBERLIN, JR.
JERRY A. PIERCE.

REFERENCES CITED

The following references are of record in the file of this patent:

UNITED STATES PATENTS

| Number | Name | Date |
|---|---|---|
| 1,748,315 | Stoewener | Feb. 25, 1930 |
| 2,102,849 | Kohatnur | Dec. 21, 1937 |
| 2,137,404 | Hollerer | Nov. 22, 1938 |
| 2,211,745 | Stephenson | Aug. 13, 1940 |
| 2,249,767 | Kistler | July 22, 1941 |
| 2,285,449 | Marshall | June 9, 1942 |
| 2,384,946 | Marisic | Sept. 18, 1945 |

FOREIGN PATENTS

| Number | Country | Date |
|---|---|---|
| 470,699 | Great Britain | Aug. 20, 1937 |

OTHER REFERENCES

Spans & Tweens, Atlas Powder Co., revised December (1943).